(12) United States Patent
Duane

(10) Patent No.: US 8,059,814 B1
(45) Date of Patent: Nov. 15, 2011

(54) TECHNIQUES FOR CARRYING OUT SEED OR KEY DERIVATION

(75) Inventor: William M. Duane, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 1082 days.

(21) Appl. No.: 11/864,001

(22) Filed: Sep. 28, 2007

(51) Int. Cl.
*H04L 9/00* (2006.01)
*H04L 1/00* (2006.01)
*H04L 29/06* (2006.01)

(52) U.S. Cl. ............ 380/45; 380/44; 380/281; 380/284; 380/286; 713/166

(58) Field of Classification Search .................... 380/44, 380/45, 281, 284, 286; 713/166
See application file for complete search history.

(56) References Cited

U.S. PATENT DOCUMENTS

| | | | |
|---|---|---|---|
| 4,424,414 A | 1/1984 | Hellman et al. |
| 4,567,600 A | 1/1986 | Massey et al. |
| 4,606,042 A | 8/1986 | Kahn et al. |
| 4,720,860 A | 1/1988 | Weiss |
| 4,759,063 A | 7/1988 | Chaum |
| 4,856,062 A | 8/1989 | Weiss |
| 4,885,778 A | 12/1989 | Weiss |
| 4,947,430 A | 8/1990 | Chaum |
| 4,998,279 A | 3/1991 | Weiss |
| 5,023,908 A | 6/1991 | Weiss |
| 5,058,161 A | 10/1991 | Weiss |
| 5,097,505 A | 3/1992 | Weiss |
| 5,168,520 A | 12/1992 | Weiss |
| 5,222,140 A | 6/1993 | Beller et al. |
| 5,237,614 A | 8/1993 | Weiss |
| 5,241,599 A | 8/1993 | Bellovin et al. |
| 5,253,295 A | 10/1993 | Saada et al. |
| 5,351,298 A | 9/1994 | Smith |
| 5,361,062 A | 11/1994 | Weiss et al. |
| 5,367,572 A | 11/1994 | Weiss |
| 5,373,558 A | 12/1994 | Chaum |
| 5,440,635 A | 8/1995 | Bellovin et al. |
| 5,485,519 A | 1/1996 | Weiss |
| 5,602,918 A | 2/1997 | Chen et al. |

(Continued)

FOREIGN PATENT DOCUMENTS

EP 1050789 11/2000

OTHER PUBLICATIONS

Bellovin et al., "Encrypted Key Exchange: Password-Based Protocols Secure Against Dictionary Attacks," Proceedings of the IEEE Symposium of Research in Security and Privacy, pp. 72-84, 1992.

(Continued)

*Primary Examiner* — Eleni Shiferaw
*Assistant Examiner* — Hilary Branske
(74) *Attorney, Agent, or Firm* — BainwoodHuang

(57) ABSTRACT

A technique carries out seed (or key) derivation within an electronic apparatus (e.g., a hand holdable electronic apparatus such as a token, an authentication server, etc.). The technique involves acquiring a stored representation of a derived seed, the stored representation of the derived seed resulting from an earlier-performed cryptographic operation based on a higher-level seed. The technique further involves (i) performing a current cryptographic operation based on a stored representation of the higher-level seed, the current cryptographic operation resulting in a current representation of the derived seed, and (ii) providing a corruption detection signal indicating whether the current representation of the derived seed matches the stored representation of the derived seed.

18 Claims, 9 Drawing Sheets

U.S. PATENT DOCUMENTS

| | | | |
|---|---|---|---|
| 5,657,388 | A | 8/1997 | Weiss |
| 5,724,428 | A | 3/1998 | Rivest |
| 5,745,576 | A | 4/1998 | Abraham et al. |
| 5,835,600 | A | 11/1998 | Rivest |
| 5,841,866 | A | 11/1998 | Bruwer et al. |
| 5,903,721 | A | 5/1999 | Sixtus |
| 5,953,420 | A | 9/1999 | Matyas et al. |
| 6,076,163 | A | 6/2000 | Hoffstein et al. |
| 6,091,819 | A | 7/2000 | Venkatesan et al. |
| 6,130,621 | A | 10/2000 | Weiss |
| 6,240,184 | B1 | 5/2001 | Huynh et al. |
| 6,269,163 | B1 | 7/2001 | Rivest et al. |
| 6,286,022 | B1 | 9/2001 | Kaliski et al. |
| 6,393,447 | B1 | 5/2002 | Jakobsson et al. |
| 6,411,715 | B1 | 6/2002 | Liskov et al. |
| 6,681,017 | B1 | 1/2004 | Matias et al. |
| 6,681,327 | B1 | 1/2004 | Jardin |
| 6,813,354 | B1 | 11/2004 | Jakobsson et al. |
| 6,829,356 | B1 | 12/2004 | Ford |
| 6,985,583 | B1 | 1/2006 | Brainard et al. |
| 7,111,172 | B1 | 9/2006 | Duane et al. |
| 7,197,639 | B1 | 3/2007 | Juels et al. |
| 7,219,368 | B2 | 5/2007 | Juels et al. |
| 7,356,696 | B1 | 4/2008 | Jakobsson et al. |
| 7,359,507 | B2 | 4/2008 | Kaliski |
| 7,363,494 | B2 | 4/2008 | Brainard et al. |
| 7,526,622 | B1* | 4/2009 | Bonwick et al. ............... 711/162 |
| 7,903,820 | B2* | 3/2011 | Waisbard ...................... 380/278 |
| 2001/0002486 | A1* | 5/2001 | Kocher et al. ................. 713/171 |
| 2002/0026345 | A1 | 2/2002 | Juels |
| 2002/0120592 | A1 | 8/2002 | Juels et al. |
| 2003/0105964 | A1* | 6/2003 | Brainard et al. .............. 713/178 |
| 2003/0188158 | A1* | 10/2003 | Kocher ......................... 713/161 |
| 2004/0017253 | A1 | 1/2004 | Ishigami et al. |
| 2006/0005049 | A1* | 1/2006 | Randell ......................... 713/193 |
| 2006/0034456 | A1* | 2/2006 | McGough ........................ 380/30 |
| 2006/0037073 | A1 | 2/2006 | Juels et al. |
| 2006/0041759 | A1 | 2/2006 | Kaliski et al. |
| 2006/0133607 | A1* | 6/2006 | Forehand et al. .............. 380/44 |
| 2006/0210082 | A1* | 9/2006 | Devadas et al. ............... 380/277 |
| 2006/0256961 | A1 | 11/2006 | Brainard et al. |
| 2007/0124321 | A1 | 5/2007 | Szydlo |
| 2007/0127719 | A1* | 6/2007 | Selander et al. ............. 380/277 |
| 2007/0174614 | A1 | 7/2007 | Duane et al. |
| 2008/0065906 | A1* | 3/2008 | Itagaki et al. ................. 713/193 |

OTHER PUBLICATIONS

Bellovin et al., "Augmented Encrypted Key Exchange: A Password-Based Protocol Secure Against Dictionary Attacks and Password File compromise," AT&T Bell Laboratories Technical Report, pp. 1-7, 1994.

Boneh et al., "On the Importance of Checking Cryptographic Protocols for Faults," (extended abstract), pp. 1-14, Jul. 26, 2001, retrieved from http://www.citeseer.nj.nec.com/boneh97importance.html.

Boneh et al., "Efficient Generation of Shared RSA Keys," pp. 1-21, Jul. 26, 2001, retrieved from http://citeseer.nj.nex.com/358268.html.

Cannetti et al., "Proactive Security: Long-Term Protection Against Break-Ins," CryptoBytes, 3:1-8, 1997.

Chaum, "Security Without Identification: Transaction Systems to Make Big Brother Obsolete," Communications of the ACM, 28: 1030-1044, 1985.

Chaum, "Blind Signatures for Untraceable Payments," Advances in Cryptology, Proceedings of the Crypto '82, Workshop on the Theory and Application of Cryptographic Techniques, Santa Barbara, CA, Aug. 23-25, 1982, New York, 1983.

Coron et al., "On the Secutiry of RSA Padding," Advances in Cryptology, Proceedings of the Crypto '99, pp. 1-18, Springer 1999.

Desmedt et al., "A Chosen Text Attack on the RSA Cryptosystem and Some Discrete Logarithm Schemes," Advances in Cryptology, Proceedings of the Crypto '85, pp. 516-522, Springer-Velag 1986.

Dierks et al., "The TLS Protocol Version 1.0," IEFT RFC 2246, pp. -75, Jan. 1999, Jul. 25, 2001, retrieved from http://www.jetf.org/rfc/rfc2246.txt.

Frier et al., "The SSL 3.0 Protocol," Netscape Communications Corp., pp. 1-62; Nov. 18, 1996, retrieved Jul. 10, 2001 from http://home.netscape.come/eng/ssl13/draft302.txt.

Gong, "Increasing Availability and Security of an Autherntication Service," IEEE Journal on Selected Areas in Communication, 11: 657-662, 1993.

Gong et al., "Protecting Poorly Chosen Secrets from Guessing Attacks," IEEE Journal of Selected Areas in Communications, 11: 648-656, 1993.

Gong, "Optimal Authentication Protocols Resistant to Password Guessing Attacks," Proceedings of the 8.sup.th IEEE Computer Security Foundations Workshop, Ireland, pp. 24-29, Jun. 13-15, 1995.

Halevi et al., "Public-Key Cryptography and Password Protocols," Proceedings from the Fifth ACM Conference on Computer and Communications Security, pp. 122-131, Nov. 3-5, 1998.

Heroux, "A Private Key Storage Server for DCE—Functional Specification," Open Software foundation, Request for Comments: 94.1,pp. 1-73, Nov. 1996, retrieved on Jul. 17, 2001 from http://www.opengroup.org/rfc/mirror-rfc/rfc94.1.txt.

Herzberg et al., "Proactive SEcret Sharing Or: How to Cope with Perpetual Leakage," Advances in Cryptology, Proceedings of the Crypto '95, pp. 339-352, California, Aug. 1995, Springer 1995.

Jablon, "Strong Password-Only Authenticated Key Exchange," ACM computer Communication Review, pp. 1-24, 1996.

Jabion, "Extended Password Key Exchange Protocols Immune to Dictionary Attack," Proceedings of the WETICE '97 Enterprise Security Workshop, pp. 248-255, 1197.

Juels et al., "Security of Blind Digital Signatures," Advances in Cryuptology, Proceedings of the Crypto '97, pp. 150-164, California, Aug. 1997, Springer 1997.

Kohl et al., "The Kerberos Network Authentication Service," RFC 1510, pp. 1-105, Internet Activities Board, Sep. 1993, retrieved on Jul. 10, 2001 from http://www.iett org/rfc/rfc1510.txt.

Law et al., "An Efficient Protocol for Authenticated Key Agreement," Technical Report CORR 98-05, pp. 1-16, Deparment of C&O, University of Waterloo, CAnada, Mar. 1998, revised Aug. 28, 1998.

Lim et al., "A Key Recovery Attack on Some Discrete Log-Based Schemes Using a Prime-Order Subgroup," Advances in Cryptology, Proceeding of the Crypto '97, vol. 1294 of Lecture Notes in Computer Science, pp. 249-263, Springer 1997.

Menezes et al., "Handbook of Applied Cryptography," Chapter 12 Key Establishment Protocols, Section 12.22 protocol Shamie's no-key protocol, p. 500, CRC Press, 1997.

M'Raihi, "Cost-Effective Payment Schemes with Privacy Regulation," Advances in Cryptology, Proceedings of ASIACRYPT '96, vol. 1163 of LNCS, pp. 266-275, 1996.

MacKenzie et al., "Secure Network Authentication with Password Identification," Submission to IEEE P1363 a working group, pp. 1-11, Jul. 30, 1999, retrieved Jul. 1, 2001 from http://www.manta.ieee.org/groups/:1363/studygroup/passwd.htm-1.

Monrose et al., "Password Hardening Based on Keystroke Dynamics," Proceedings of the 6.sup.th ACM Conference on Computer and Communications Security, pp. 73-82, Nov. 1-4, 1999, Singapore, retrieved Sep. 6, 2000 from http://www.acm.org/pubs/contents/proceedings/commsec/319709.

Perlman et al., "Secure Password-Based Protocol for Downloading a Private Key," Proceedings of the 1999 Network and Distributed System Security Symposium, Internet Society, Jan. 1999.

Pohlig et al., "An Improved Algorithm for Computing Logarithms Over GF(p) and Its Cryptographic Signigicance," IEEE Transactions on Information Theory, 24: 106-110, 1978.

Pointcheval et al., "Probably Secure Blind Signature Schemes," Advances in Cryptology, Proceedings of the ASIACRYPT '96, pp. 252-265, Kyongju, Korea, Nov. 1996, Springer 1996.

Rankl, "Handbuch der Chipkarten," HANSER_VERLAG, 2002, Munchen 050428, 203-210.

Rivest et al, "A Method for Obtaining Digitan Signatures and Public-Key Cryptosystems," Communications of the ACM, 21: 120-126, 1978.

"Skipjack and Kea Specifications," NIST, pp. 1-23, May 29, 1998 retrieved on Jul. 10, 2001 from http://csrc.nist.gov/encryption/skipjack-kea.htm.

Stadler et al., "Fair Bling Signatures," Advances in Cryptology, Proceedings of the EUROCRYPT '95, pp. 209-219, International Conference on the Theory and Application of Cryptographic Techniques, Saint-Malo, France, May 21-25, 1995, Springer 1995.

von Solms et al., "On Blind Signatures and Perfect Crimes," Computer and Security, 11: 581-583, 1992.

Wu, "The Secure Remote Password Protocol," Proceedings of the 1998 Network and Distributed System Security Symposium, pp. 1-15, Internet Society, Jan. 1998.

Zuccherato, "Methods for Avoiding the 'Small Subgroup' Attacks on the Diffie-Hellman Key Agreemnent for S/MIMI," IEFT Internet-Draft, pp. 1-11, Jun. 1999, retrived on Aug. 29, 2001 from http://www.ietf.org/proceedings/99:ul/1-D/draft/ieft-smime-small0subgroup-ol.txt.

International Search Report for PCT/US2006/005606, mailed on Aug. 1, 2006.

* cited by examiner

TECHNIQUES FOR CARRYING OUT SEED OR KEY DERIVATION

TECHNICAL FIELD

This invention generally relates to the field of electronics-based authentication and, more particularly, to techniques involving cryptographic seed or key derivation.

BACKGROUND

Within a conventional authentication system, a hardware authenticator (sometimes called a token) and an authentication server work together to grant the token holder with login access using one-time use passwords (OTPs) which are often referred to as OTP codes, one-time passcodes, and pseudo-random numbers, among other terms. To this end, both the token and the authentication server share a symmetric key (i.e., a secret which is not otherwise known). The token uses this key to produce a series of one-time use passwords. Concurrently, the authentication server carries out the same operations on its end to produce the same series of one-time use passwords. Accordingly, at any time, the token holder is capable of providing a matching one-time use password from the token to the authentication server to prove that the token holder possesses the token. An authentication-based arrangement which carries out authentication in a manner which is similar to that explained above is described in U.S. Pat. No. 6,985,583, the teachings of which are hereby incorporated by reference in their entirety.

For the initially-described conventional authentication system, it is possible for each of the token and the server to generate a set of keys where keys are derived from precursor keys; and where each key may be involved in the derivation of one or more subordinate keys over time, as shown in FIG. 1. Examples of the relationship between the keys in such a structure are often shown as chains of key, a tree of keys, a branch of a tree of key, or some other representation. That is, these authentication devices carry out a first key derivation function to derive a first derived key from a master key. Next, these devices carry out a second key derivation function to derive a second derived key from the first derived key, and so on. Each key derivation function may include, as additional input, extra information (e.g., a nonce value, a predefined value, a group password, etc.) as an additional security measure. The devices then use the lowest-level derived key at the time of authentication to produce a one-time use password.

It should be understood that, if the keys of the token are corrupted (e.g., due to a gamma ray burst, thermal noise, a power glitch, radio frequency interference, etc.), such corruption typically is detected when the token holder tries to authenticate with the authentication server. In particular, the token holder tries to submit a password based on a corrupted key and the authentication server refuses to authenticate the token holder. After several futile authentication attempts, the token holder typically contacts an administrator of the authentication server who eventually determines that the token is defective and no longer useful. The administrator then provides the token holder with a new token to replace the defective token.

SUMMARY

Unfortunately, the above-described conventional approach to detecting a defective token and subsequently replacing the defective token with a new token is extremely burdensome. In particular, the token holder must suffer through several unsuccessful attempts to authenticate with the authentication server. Additionally, the token holder must then manually contact the administrator of the authentication server and wait for the administrator to conclude that the token has become defective. Furthermore, the administrator must then replace the defective token with a new token.

In contrast to the above-described conventional approach to detecting and replacing a defective token with a new token, an improved technique involves determining whether a stored seed record (e.g., a stored master key value, a stored derivative key value, etc.) is corrupted prior to deriving a new seed record from the stored seed record. If the stored seed record is not corrupted, the new seed record can be derived safely from the stored seed record. However, if the stored seed record is corrupted, the stored seed record can be properly recreated (e.g., from a higher-level seed record) prior to deriving the new seed record. As a result, the technique provides both error detection and error correction capabilities to seed derivation. In the context of an authentication system, the technique provides authentication devices of the system with self-repair capabilities thus alleviating the need to manually detect defective devices and fix/replace equipment if there is a corrupted seed record.

One embodiment is directed to a technique for carrying out seed derivation within an electronic apparatus (e.g., a hand holdable electronic apparatus such as a token, an authentication server, etc.). The technique involves acquiring a stored representation of a derived seed (or key), the stored representation of the derived seed resulting from an earlier-performed cryptographic operation based on a higher-level seed. The technique further involves (i) re-running the cryptographic operation which resulted in the initial creation of the derived seed to produce a current representation of the derived seed, and (ii) providing a corruption detection signal indicating whether the current representation of the derived seed matches the stored representation of the derived seed.

If the corruption detection signal indicates that the current representation of the derived seed matches the stored representation of the derived seed, the stored representation of the higher-level seed has not changed since it was created. Accordingly, the stored representation of the higher-level seed is intact and is available for use in deriving a new seed.

Additionally, the current representation and the stored representation of the derived seed are also intact. As a result, the current representation of the derived seed (or alternatively the stored representation of the derived seed) is available for use in deriving a new seed (e.g., a new seed can be created from the current derived seed plus additional data).

However, if the corruption detection signal indicates that the current representation of the derived seed does not match the stored representation of the derived seed, either the stored representation of the higher-level seed has changed since it was created or the stored representation of the derived seed has changed since it was created. At this point, the apparatus determines whether the stored representation of the higher-level seed is corrupted and, if so, replaces it with a new representation prior to deriving the new seed. In particular, a similar process as that just described is applied to the higher-level seed to verify its integrity. In essence, the technique is repeated to scrutinize the seed hierarchy up one level.

Such recursion continues until a correct derived seed and a correct precursor higher-level seed is located. Accordingly, derivation of the new seed does not take place until reliability of the higher-level seed is confirmed and, if necessary, any discovered corrupted seeds are properly regenerated.

It should be understood that the above-described technique does not necessarily need to access a master seed record to repair a corrupted seed record. Rather, if the next-higher level seed record is intact, a new seed can be derived from that next-higher level seed record without accessing the master seed record. For example, suppose that a token has a fourth-level seed record (i.e., a seed record derived from three higher level seed records). Further suppose that the fourth-level seed record is corrupted due to an environmental anomaly (e.g., a gamma ray burst) but that the third-level seed record, from which the fourth-level seed record had been derived, is intact. In this situation, a new fourth-level seed record can be re-derived from the intact third-level seed record without accessing the master seed. Moreover, even if the third-level seed record is also corrupted, it may be possible to re-derive a new third-level seed record from an intact second-level seed record and so on without accessing the master seed record. Such iterative error detection and correction operation makes this technique more secure against side channel attacks which attempt to discover the master seed record (e.g., simple power analysis (SPA), differential power analysis (DPA), etc.) since master seed record access is minimized.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved seed derivation technique involves determining whether a stored seed record (or key) is corrupted prior to deriving a new seed record from the stored seed record. If the stored seed record is not corrupted, the new seed record can be derived safely from the stored seed record. However, if the stored seed record is corrupted, the stored seed record can be properly recreated prior to deriving the new seed record. As a result, the technique provides both error detection and error correction capabilities to seed record derivation. In the context of an authentication system, the technique provides the authentication devices of the system with self-repair capabilities thus alleviating the need to manually detect defective devices and fix/replace equipment if there is a corrupted seed record.

Figure 2:
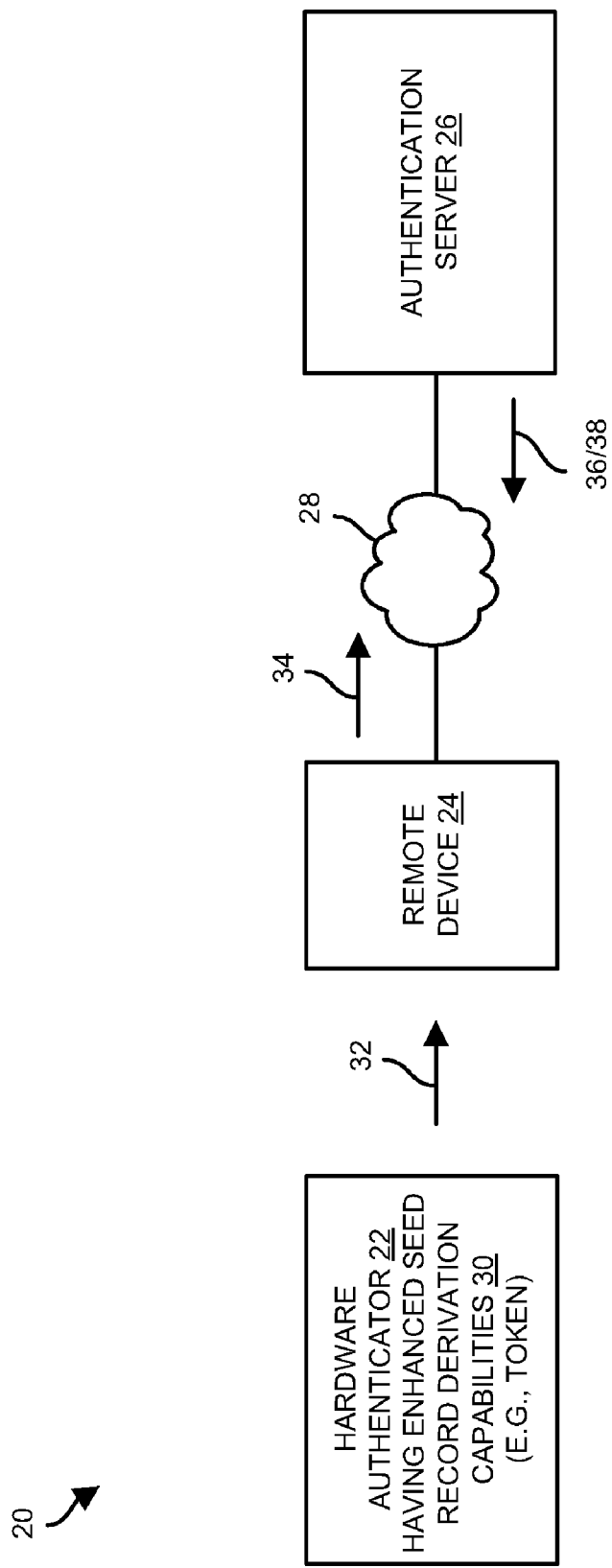
FIG. 2 is a block diagram of an authentication system which carries out an improved seed record derivation technique.

FIG. 2 shows an authentication system 20 with self-repairing seed derivation capabilities. The authentication system 20 includes a hardware authenticator 22, a remote device 24, an authentication server 26, and a communications medium 28. The hardware authenticator 22 has enhanced seed record derivation capabilities 30 which will be described in further detail shortly. Optionally, the authentication server 26 has similar enhanced seed record derivation capabilities as well.

By way of example only, the authentication system 20 will be hereinafter described in the context of computer-based arrangement in which a user in possession of the hardware authenticator 22 remotely authenticates with the authentication server 26 through the remote device 24, i.e., through a computer such as a laptop, a workstation or a desktop PC. In this example, the hardware authenticator 22 is preferably a hand holdable electronic apparatus (e.g., a token) which the user is a capable of conveniently carrying around on a regular basis (e.g., within a pocket, on a key chain, within a credit card slot of a wallet, etc.). The hardware authenticator 22 is capable of generating a series of time-dependent passwords 32, e.g., a new password 32 every 60 seconds. To obtain the current password 32, the user reads the password 32 from a display screen (e.g., an LCD display) of the hardware authenticator 22. In some arrangements, the user presses a button of the hardware authenticator 22 prior to reading the password 32.

To authenticate with the authentication server 26, the user inputs the current password 32 into the remote device 24. The remote device 24 then transmits an authentication request 34 containing the password 32 and possibly other data to the authentication server 26 through the communications medium 28 (e.g., copper wire, fiber optic cable, wireless medium, a computerized network, combinations thereof, etc.). If the authentication server 26 agrees that the password 32 is correct, the authentication server 26 provides a positive response 36 back to the remote device 24 granting electronic access to the user. However, if the password 32 is incorrect, the authentication server 26 provides a negative response 38 back to the remote device 24 denying electronic access to the user.

It should be understood that a variety of alternative mechanisms are available for entering the password 32 into the remote device 24. For example, in some arrangements, the user simply plugs a connector (e.g., a standard USB port) of the hardware authenticator 22 into a corresponding connector on the remote device 24. The remote device 24 in turn electronically reads the password 32 from the hardware authenticator 22 and sends the password 32 to the authentication server 26 to authenticate the user.

Figure 1:
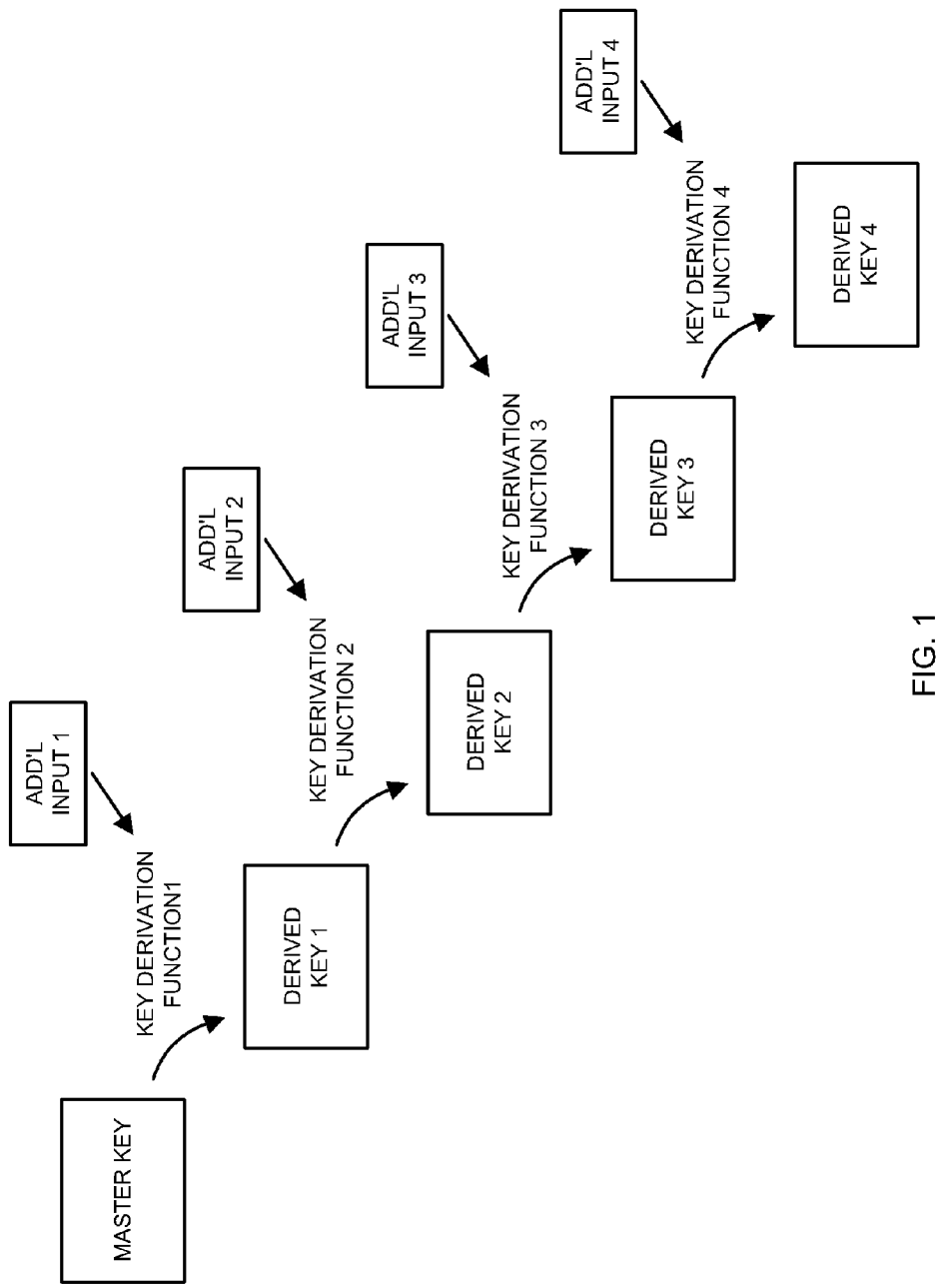
FIG. 1 is a view of a conventional chain (or branch of a tree) of derived keys stemming from a master key.

It should be further understood that the remote device 24 and the authentication server 26 are shown in FIG. 1 as being physically separated by the communications medium 28 (illustrated as including a network cloud by way of example only). Other layouts and topologies are suitable for use as well. In some arrangements, the remote device 24 and the authentication server 26 are more tightly integrated. For example, the remote device 24 is capable of being implemented as the input/output (I/O) components (e.g., keyboard, mouse and monitor) of a single computer whose processing circuitry operates as the authentication server 26. Further details of the enhanced seed record derivation capabilities 30 will now be provided with reference to FIG. 3.

Figure 3:
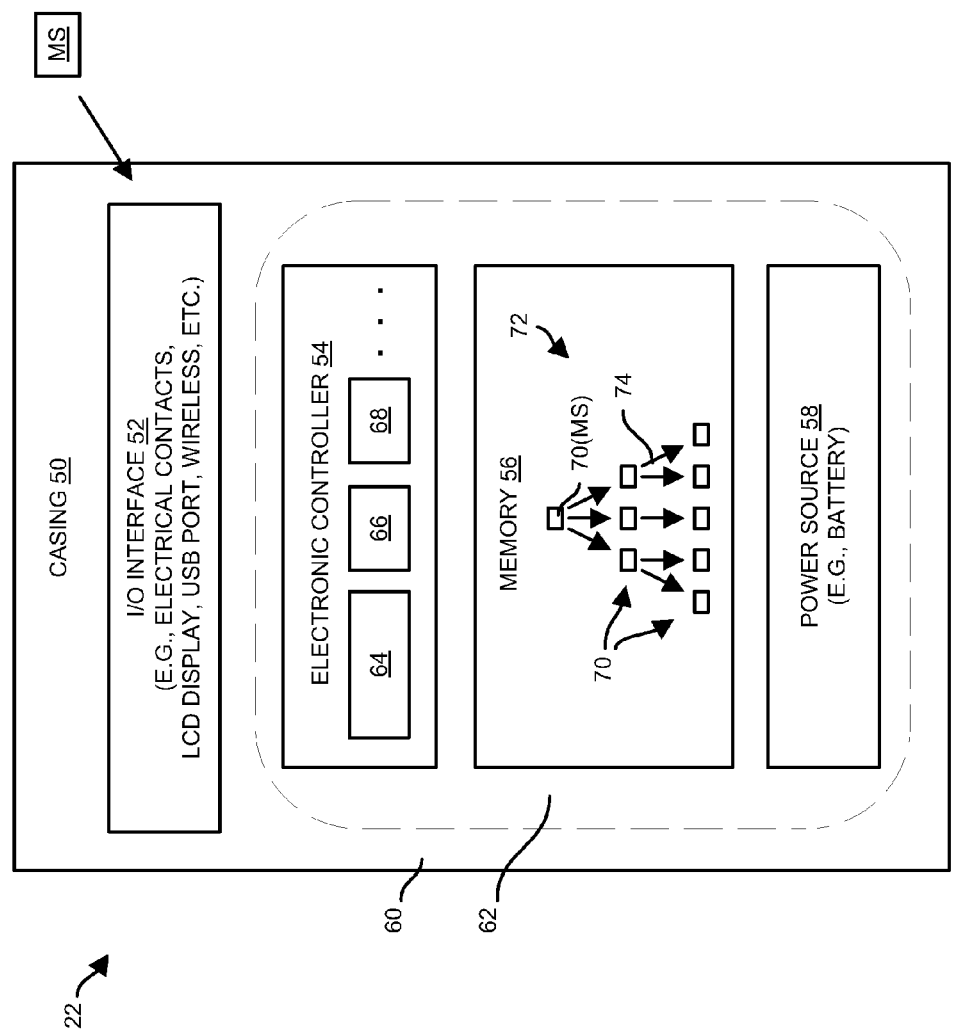
FIG. 3 is a block diagram of a hardware authenticator of the authentication system of FIG. 1.

FIG. 3 is a block diagram of the hardware authenticator 22. The hardware authenticator 22 includes a casing (or support) 50, an I/O interface 52, an electronic controller 54, memory 56, and an optional power source 58. The casing 50 includes a set of peripheral walls 60 which supports the other authenticator components. Furthermore, the set of peripheral walls 60 defines an optional tamper resistant internal space 62 within which the electronic controller 54, the memory 56, and the optional power source 58 reside.

The I/O interface 52 (e.g., a set of electrical contacts, an optical, RF or acoustic interface, etc.) enables a manufacturer to electronically test and program the hardware authenticator 22. For example, the manufacturer loads a master seed MS into the hardware authenticator 22 through the interface. The master seed MS is a secret which is shared between the hardware authenticator 22 and the authentication server 26. Both of these electronic devices 22, 26 store the master seed MS in a locally stored master seed record 70(MS) and generate a hierarchy 72 (e.g., a chain or tree) of seed records 70 from the master seed record 70(MS) as part of the password generation process (also see the memory 56 in FIG. 3).

The I/O interface 52 further includes an additional I/O mechanism which enables the user to obtain time-dependent passwords 32 (FIG. 2) from the hardware authenticator 22. In some arrangements, the I/O interface 52 further includes a button and a visual display, with the visual display being configured to output a current password 32 in response to a press of the button. In other arrangements, the I/O interface 52 further includes an electrical connector (e.g., a USB port) which electronically outputs a current password 32 when the electrical connector mates with a corresponding electrical connector of the remote device 24 (also see FIG. 2). Other arrangements are suitable for use as well e.g., the I/O interface 52 may include an antenna or transmitter for wireless activation and communications, the I/O interface 52 may include a keypad which requires the token holder to enter a code prior to obtaining the password 32, etc.

Still with reference to FIG. 3, the electronic controller 54 optionally includes a low-power processing circuit 64, a clock circuit 66, and a nonce parameter circuit 68, among other circuitry. The low-power processing circuit 64 is constructed and arranged to generate the hierarchy 72 of seed records 70 from the master seed record 70(MS) and store the hierarchy 72 of seed records 70 in the memory 56. Each generated seed record 70 represents a derived seed. The optional clock circuit 66 is constructed and arranged to mark time synchronously with the authentication server 26, and to direct the processing circuit 64 to generate new seed records 70 at certain times. The optional nonce parameter circuit 68 is constructed and arranged to provide a nonce parameter NP (i.e., a parameter whose value changes over time). When the processing circuit 64 generates a new seed record 70, the processing circuit 64 uses a particular value of the nonce parameter NP as an input, and then stores that particular nonce parameter value together with the new seed record 70 in the memory 56.

In some arrangements, the nonce parameter circuit 68 provides, as the nonce parameter, the contents of a digital counter which increments or decrements at regular (i.e., consistent predetermined) intervals over time. In other arrangements, the nonce parameter circuit 68 outputs a digital time value as the nonce parameter. Other arrangements for the nonce parameter circuit 68 are suitable for use as well such as a barrel shifter or a circuit which sequences through a list of predefined random numbers in a time-synchronous manner, etc.

When the processing circuit 64 derives a new seed from an earlier-derived seed, the processing circuit 64 performs a cryptographic operation 74 (illustrated by the arrows 74 of the seed record hierarchy 72) by applying a cryptographic algorithm to an earlier-derived higher-level seed and taking the current value of the above-described nonce parameter NP and perhaps additional parameters as input. The Advanced Encryption Standard AES-128 algorithm, among several others, is an example of an encryption algorithm which is suitable for use in this context. Further details of the cryptographic operation 74 will be provided shortly.

The memory 56 is constructed and arranged to store and load information. In particular, the memory 56 stores the seed record hierarchy 72 for use in generating passwords 32 for the user. In some arrangements, the memory 56 is semiconductor-based such as low-power SRAM, flash memory, combinations thereof, etc.

The optional power source 58 (e.g., a battery, power cells, etc.) provides power to the various components of the hardware authenticator 22 for operation. Preferably, the power source 58 provides enough power to enable the hardware authenticator 22 to robustly and reliably operate for at least a pre-defined lifetime of the hardware authenticator 22 (e.g., three years, five years, six years, etc.). It should be understood that some hardware authenticators 22 (e.g., those that connect to a USB port) do not require their own power source.

At this point, it should be understood that the hardware authenticator 22 has a seed record derivation enhancement which enables the hardware authenticator 22 to repair itself if a seed record 70 (i.e., a stored binary representation of a seed or key) becomes corrupted during the operating life of the hardware authenticator 22. For example, a bit of a particular seed record stored in the memory 56 may flip due to some environmental influence (e.g., due to a gamma ray burst, thermal noise, a power glitch, radio frequency interference, etc.). Without the ability of the hardware authenticator 22 to repair itself, any future-generated password 32 may not properly authenticate with the authentication server 26.

As part of the repair process, the processing circuit 64 of the hardware authenticator 22 is constructed and arranged to check whether a higher-level seed record 70 has been corrupted before using that higher-level seed record 70 in a next seed derivation operation. If the higher-level seed record 70 is not corrupted, the hardware authenticator 22 safely and reliably uses that higher-level seed record 70. However, if the higher-level seed record 70 is corrupted, the hardware authenticator 22 re-creates the higher-level seed record 70 and uses the re-created higher-level seed record 70. With this self-repairing capability of the hardware authenticator 22, there is no need to replace the hardware authenticator 22 as in the earlier-described conventional token replacement approach. Further details of this self-repairing capability will now be provided with reference to FIGS. 4 through 6.

Figure 4:
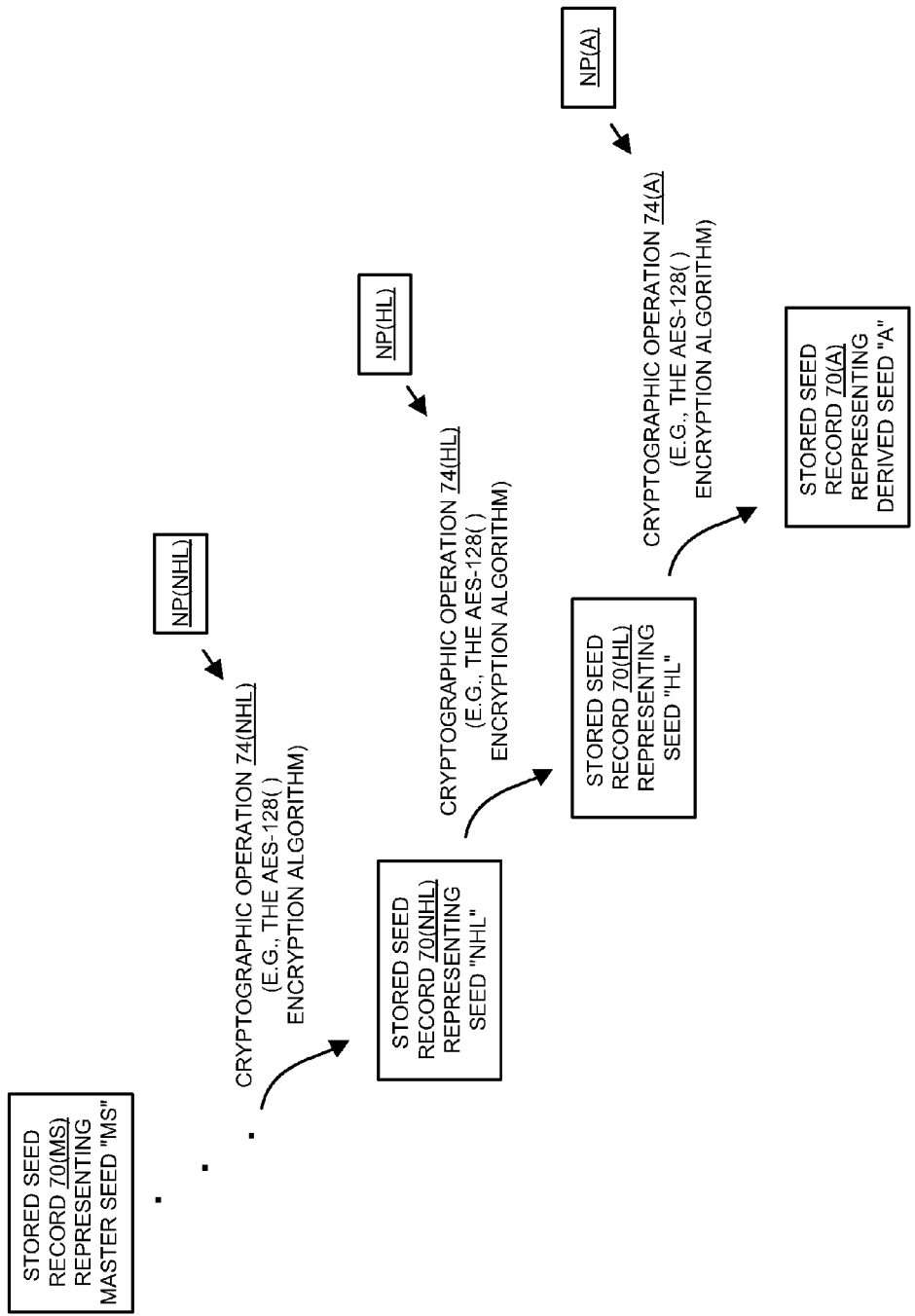
FIGS. 4 through 6 are illustrations of an example seed derivation procedure carried out by the authentication system of FIG. 1.
Figure 5:
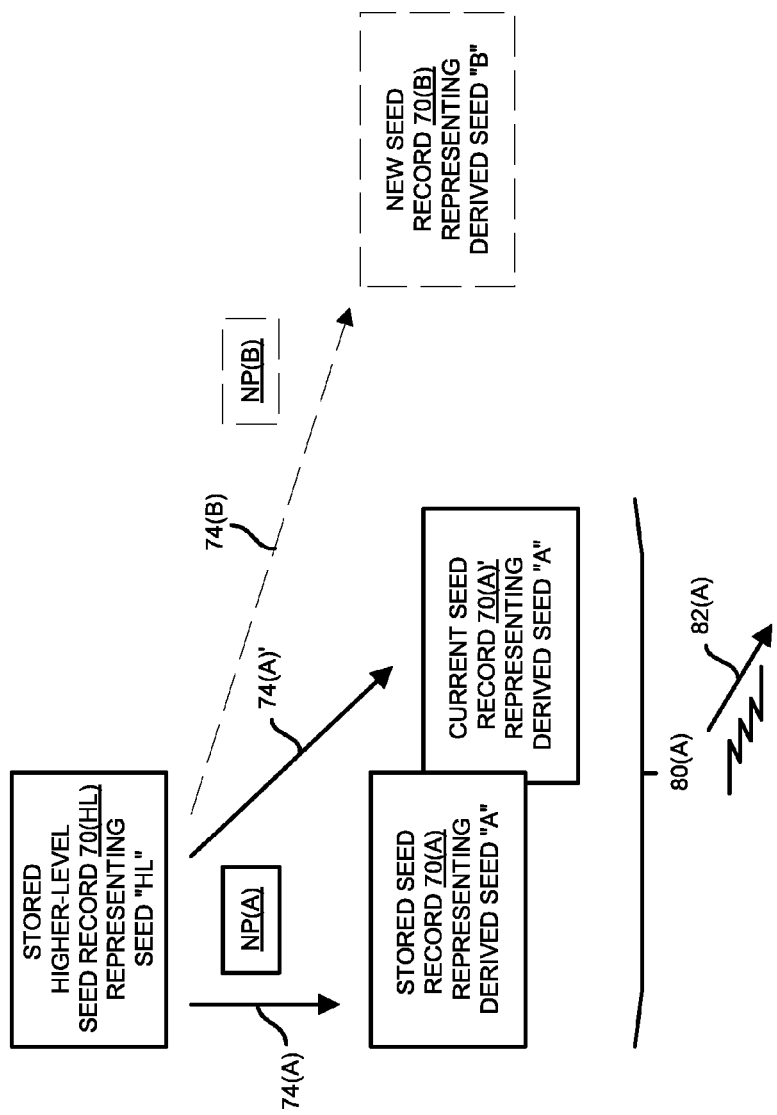
Figure 6:
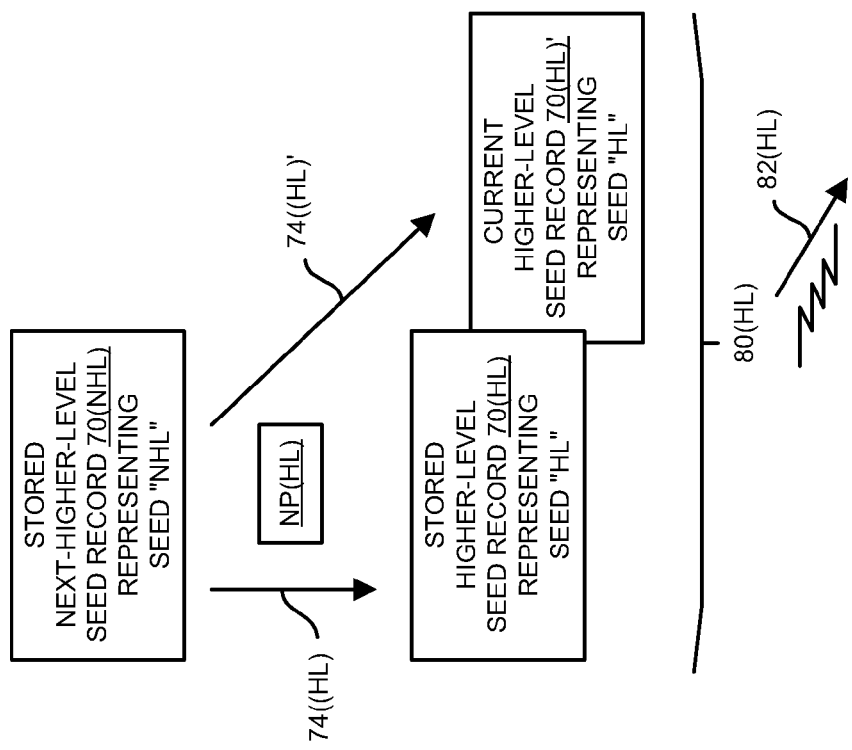

FIGS. 4 through 6 illustrate how the hardware authenticator 22 is able to derive a new seed record 70 from a confirmed intact seed record 70 to achieve fault-tolerant seed (or key) derivation. Recall that, as mentioned earlier with reference to FIG. 3, the memory 56 stores the hierarchy 72 of seed records 70 along with the nonce parameter value used to generate each seed record 70. It should be understood that the hierarchy 72 is actually a tree, and that the hierarchy 72 is illustrated as a single tree branch in FIG. 4 for simplicity. It should be further understood that the electronic controller 54 may supplant a portion of the branch starting at any point along the branch at regularly scheduled times, and that the electronic controller 54 uses the lowest seed record in the branch to generate passwords 32.

FIG. 4 shows a lower portion of the seed record hierarchy 72 stored in the memory 56. Here, the memory 56 stores a seed record 70(A), which represents a derived seed "A", and the nonce parameter value NP(A). Both the stored seed record 70(HL) and the nonce parameter value NP(A) were used as an input to a cryptographic operation 74(A) that generated the seed record 70(A).

Additionally, the memory 56 stores a higher-level seed record 70(HL), which represents a higher-level derived seed "HL", and the nonce parameter value NP(HL). Similarly, both the stored seed record 70(NHL) and the nonce parameter value NP(HL) were used as an input to a cryptographic operation 74(HL) that generated the seed record 70(HL). Furthermore, the memory 56 stores a next-higher-level seed record 70(NHL), which represents a next higher-level derived seed "NHL" and the nonce parameter value NP(NHL). Both the stored seed record 70 above the stored seed record 70(NHL) and the nonce parameter value NP(NHL) were used as an input to a cryptographic operation 74(NHL) that generated the seed record 70(NHL), and so on.

At some point and as shown in FIG. 5, the hardware authenticator 22 must derive a new seed record 70(B) to supplant the previous seed record 70(A). In particular, after a period of time has elapsed (e.g., every half hour, every hour, a day, etc.), the clock circuit 66 of the electronic controller 54 directs the processing circuit 64 to derive the new seed record 70(B) to represent a new seed "B" from higher-level seed "HL" (also see FIG. 3). Keep in mind that, if the stored higher-level seed record 70(HL) is corrupted, the new seed record 70(B) derived from the seed record 70(HL) would be useless. That is, a password 32 based on the new seed record 70(B) would not match the expected password 32 at the authentication server 26 (FIG. 2). Accordingly, the authentication server 26 would refuse to authenticate the holder of the hardware authenticator 22.

To derive the new seed record 70(B) in a non-corrupted manner, the processing circuit 64 re-generates the derived seed "A". In particular, the processing circuit 64 performs a cryptographic operation 74(A)' in the same manner as the earlier-performed cryptographic operation 74(A). That is, the processing circuit 64 uses the stored higher-level seed record 70(HL) and the stored nonce parameter NP(A) to create a seed record 70(A)', which is a current representation of the seed "A". The processing circuit 64 then performs a compare operation 80(A) on the stored seed record 70(A) and the current seed record 70(A)', and provides a corruption detection signal 82(A) indicating whether the seed records 70(A), 70(A)' match.

If the corruption detection signal 82(A) indicates that the seed records 70(A), 70(A)' match, the processing circuit 64 concludes that the stored higher-level seed record 70(HL) is intact, i.e., the processing circuit 64 determines that the seed record 70(HL) has not changed since the processing circuit 64 created and stored it in the memory 56. In addition, if the corruption detection signal 82(A) indicates that the seed records 70(A), 70(A)' match, the processing circuit 64 further concludes the derived seed 70(A) is intact. Accordingly, the processing circuit 64 generates the new seed record 70(B) representing the new seed "B". In particular, the processing circuit 64 carries out a cryptographic operation 74(B) using the stored higher-level seed record 70(HL) and the nonce parameter value NP(B) to generate the new seed record 70(B), and stores both the new seed record 70(B) and the nonce parameter value NP(B) in the memory 56. The processing circuit 64 is capable of deleting the seed record 70(A) from the memory 56 after generating and storing the seed record 70(B) since the seed record 70(A) is no longer needed. As a result of the above-described operation, the hardware authenticator 22 is able to use the new seed record 70(B) to provide a new password 32 which results in proper authentication with the authentication server 26 (FIG. 2).

However, if the corruption detection signal 82(A) indicates that the seed records 70(A), 70(A)' do not match, the processing circuit 64 concludes that either (i) the stored higher-level seed record 70(HL) is corrupted or (ii) the stored seed record 70(A) is corrupted. As shown in FIG. 6, to determine whether the stored higher-level seed record 70(HL) is corrupted, the processing circuit 64 performs a cryptographic operation 74(HL)' in the same manner as the earlier-performed cryptographic operation 74(HL) (also see FIG. 4). That is, the processing circuit 64 uses the stored next-higher-level seed record 70(NHL) and the stored nonce parameter NP(HL) to create a seed record 70(HL)', which is a current representation of the seed "HL". The processing circuit 64 then performs a compare operation 80(HL) on the stored seed record 70(HL) and the current seed record 70(HL)', and provides a corruption detection signal 82(HL) indicating whether the seed records 70(HL), 70(HL)' match.

If the corruption detection signal 82(HL) indicates that the seed records 70(HL), 70(HL)' match, the processing circuit 64 concludes that the stored higher-level seed record 70(HL) is intact. Accordingly, the processing circuit 64 generates the new seed record 70(B) representing the new seed "B" using the stored higher-level seed record 70(HL) (see FIG. 5).

However, if the corruption detection signal 82(HL) indicates that the seed records 70(HL), 70(HL)' do not match, the processing circuit 64 concludes that either (i) the stored next-higher-level seed record 70(NHL) is corrupted or (ii) the stored seed record 70(HL) is corrupted. In this situation, the processing circuit 64 then proceeds up one more level and carries out a scrutiny similar to that described above to determine whether the stored next-higher-level seed record 70(NHL) is corrupted. That is, the processing circuit 64 carries out a comparison similar to that shown in FIG. 6 but at the next higher level in the seed record hierarchy 72.

If this scrutiny indicates that the stored seed record 70(NHL) is intact, the processing circuit 64 knows that stored seed record 70(HL) must have been corrupted and replaces the stored seed record 70(HL) with the newly created seed record 70(HL)' in the memory 56 so that the newly created seed record 70(HL)' accurately represents the seed "HL", i.e., the hardware authenticator 22 has carried out a success self-repair of its seed records 70. Additionally, the processing circuit 64 further generates the new seed record 70(B) from the seed record 70(HL)' and the nonce parameter NP(B). If the scrutiny indicates that the integrity of the stored seed record 70(NHL) is suspect (i.e., the processing circuit 64 carries out similar scrutiny of the seed records 70 at the next higher level, and so on. Once the processing circuit 64 finds an intact seed record 70 after moving up the chain, the processing circuit 64 replaces all of the stored seed records from the intact seed record 70 down to the seed record 70(HL) thus competently repairing the seed record hierarchy 72.

At this point, one should appreciate that the integrity testing of seeds 70 is capable of being implemented as a recursive function which is capable of calling itself until it reaches the stored master seed record 70(MS). As a result, the hardware authenticator 22 is capable of accessing higher-levels of the seed record hierarchy 72 (FIG. 2) all the way up to the stored master seed record 70(MS) for fault-tolerant error detection and correction. However, the processing circuit 64 of the hardware authenticator 22 only traverses the hierarchy 72 as far as it needs to thus making the seed derivation mechanism more resistant to side channel attacks which attempt to discover the master seed record 70(MS). In particular, portions of the seed record hierarchy 72 can be accessed and even recreated but only as absolutely necessary.

It should be understood that the enhanced seed derivation discussed above with reference to FIGS. 4 through 6 was described as being carried out in response to a scheduled supplanting of the lowest-level seed record 70(A) with a new seed record 70(B). It should be understood that the same process is capable of being applied to a seed record 70 in the middle of a chain (e.g., the seed record 70(NHL) in FIG. 4) at a scheduled time. Here, the processing circuit 64 is able to work up the chain from the middle position to verify the intactness of the seed records 70 above that position, as well as then work down the chain to generate additional derivative seed records 70 to complete the chain. Further details will now be provided with reference to FIG. 7.

Figure 7:
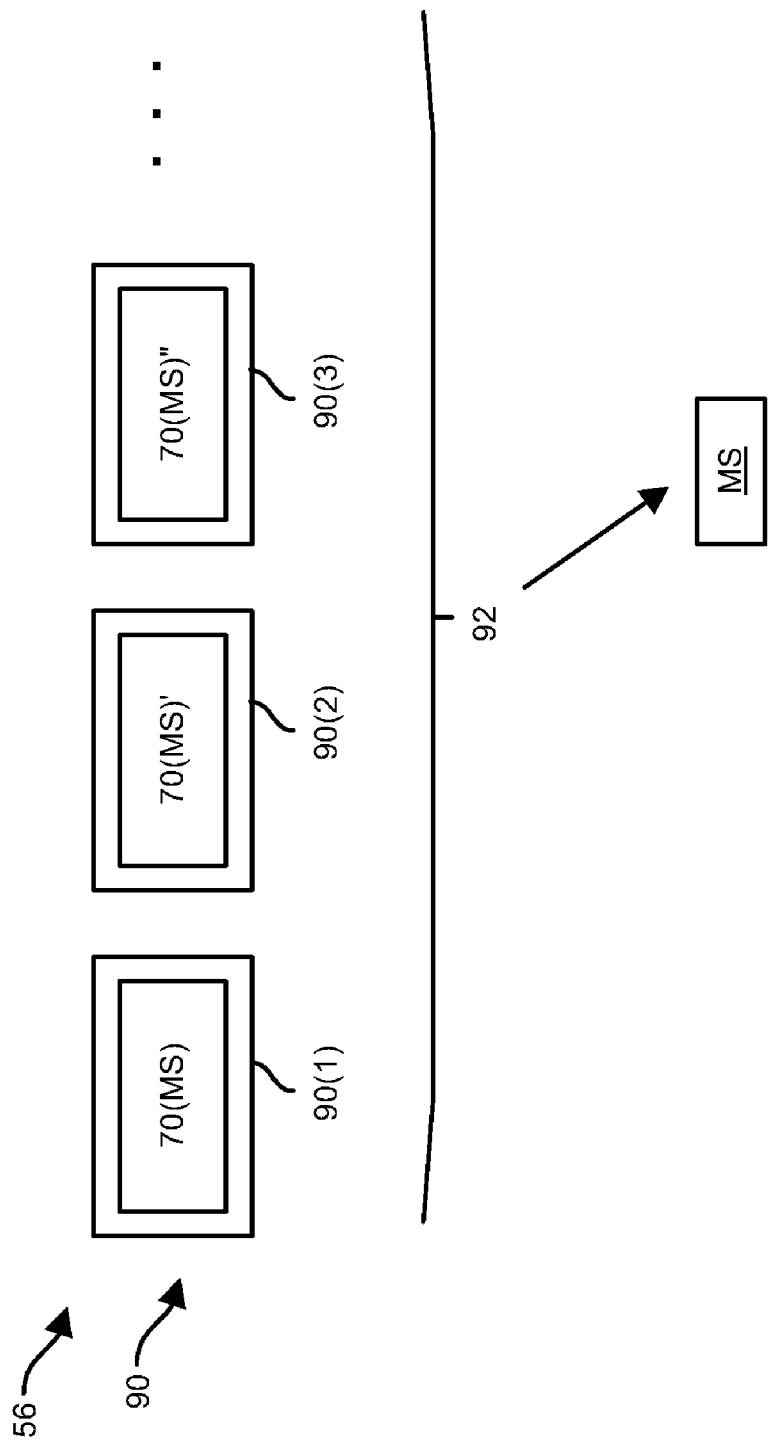
FIG. 7 is a block diagram of a technique for selecting a master seed record from multiple master seed records.

FIG. 7 shows a master seed verification technique which is carried out by the electronic controller 54 to provide fault tolerance against a possible corruption of the master seed MS. The electronic controller 54 uses this technique because, by definition in the context of the hardware authenticator 22, the master seed MS is the highest level seed thus preventing the technique shown in FIGS. 4 through 6 from being able to determine whether the master seed MS is intact based on a higher-level seed.

As shown in FIG. 7, the memory 56 stores multiple master seed records 70(MS), 70(MS)', 70(MS)" . . . (e.g., three master seed records, four master seed records, etc.) as a precaution against possible master seed corruption. Here, each master seed record 70(MS), 70(MS)', 70(MS)" . . . resides in a separate storage location 90(1), 90(2), 90(3), . . . (collectively, storage locations 90) of the memory 56. Preferably, the storage locations 90 are non-adjacent, e.g., in different memory sections/segments. In some arrangements, the storage locations 90 reside in SRAM. In some arrangements, at least one of the storage locations 90 is in SRAM and at least one of the storage locations 90 is in flash memory since the different types of memories have different strengths and vulnerabilities.

If the processing circuit 64 of the hardware authenticator 22 is tasked with accessing the master seed MS, the processing circuit 64 carries out a polling/tallying operation 92. In particular, the processing circuit 64 reads the master seed records 70(MS), 70(MS)', 70(MS)" . . . , and selects the predominant value represented by the master seed records 70(MS), 70(MS)', 70(MS)" . . . as the master seed MS. Preferably, there are at least three memory locations 90 from which to sample. Accordingly, if by chance one of the master seed records 70(MS), 70(MS)', 70(MS)" . . . becomes corrupted, the processing circuit 64 is able to resolve the master seed "MS" in a quorum-style manner, i.e., the resolved master seed value is the value that occurs most often among the memory locations 90. Further details will now be provided with reference to FIG. 8.

Figure 8:
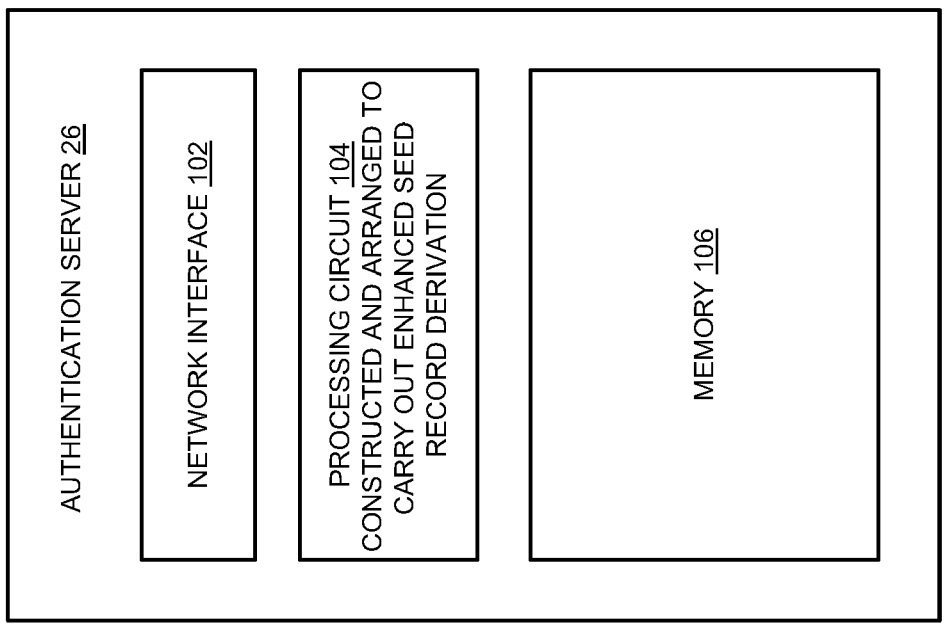
FIG. 8 is a block diagram of an authentication server of the authentication system of FIG. 1.

FIG. 8 shows an enhanced authentication server 26 which carries out a self-repairing seed record process similar to that carried out by the hardware authenticator 22. The authentication server 26 includes network interface 102, a processing circuit 104, and memory 106. The network interface 102 is constructed and arranged to connect the authentication server 26 to the communications medium 28 (also see FIG. 2) for reliable communications with the remote device 24. The processing circuit 104 is constructed and arranged to authenticate one or more hardware authenticators 22. The memory 106 stores seed record hierarchies corresponding to the hardware authenticators 22.

During operation, the processing circuit 104 authentication server 26 is constructed and arranged to respond to authentication requests 34 (also see FIG. 2) received through the network interface 102 while carrying out management of stored seed hierarchies in the same manner as the processing circuit 64 of the hardware authenticator 22. Accordingly, the authentication server 26 enjoys the same error detection and error correction benefits as those of the earlier-described hardware authenticator 22. Such an optional enhancement to the authentication server 26 enables the authentication server 26 to continue operation in a manner that minimizes the risk of discovery of the master seed at the location of the authentication server 26. Further details will now be provided with reference to FIG. 9.

Figure 9:
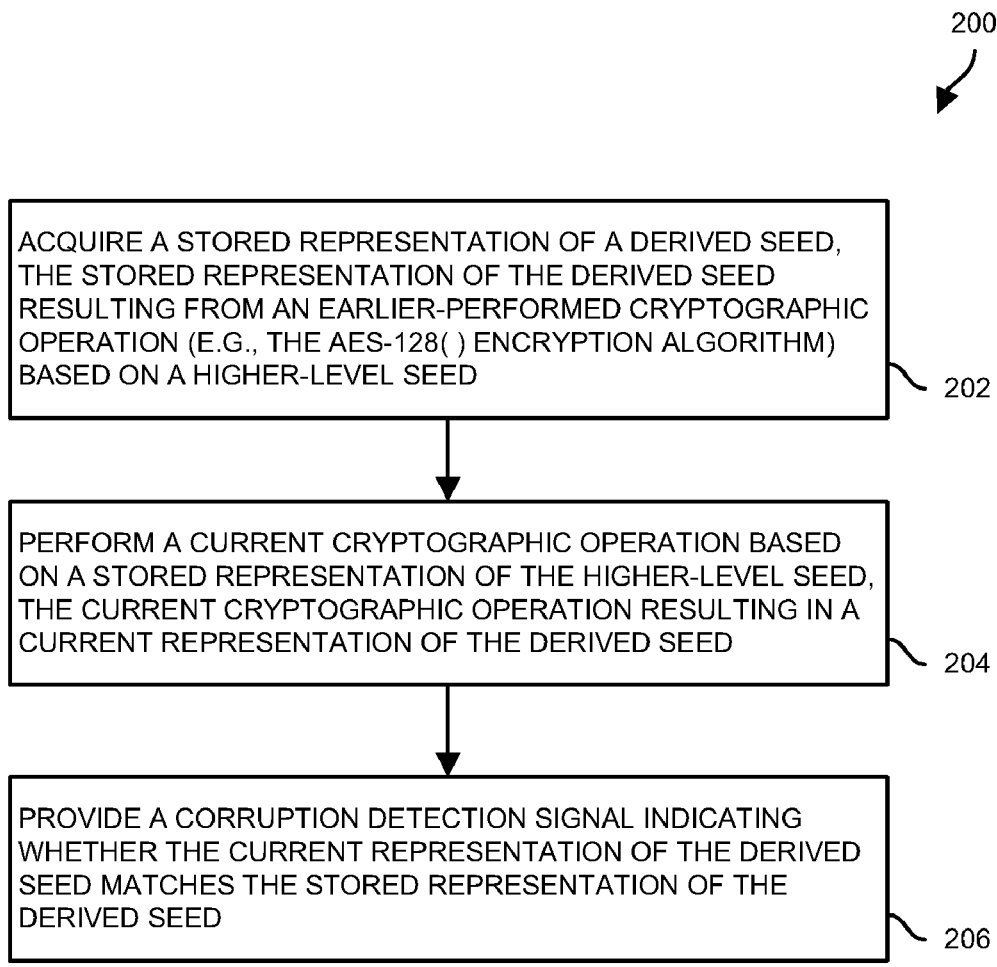
FIG. 9 is a flowchart of a procedure which is capable of being performed by either the hardware authenticator or the authentication server of the authentication system of FIG. 1.

FIG. 9 shows a flowchart of a procedure 200 which is performed by an electronic device such as either of the authentication devices 22, 26 of the authentication system 20 for enhanced seed derivation. In step 202, the electronic device acquires a stored representation of a derived seed 70 (e.g., see the seed record 70(A) in FIG. 4). The stored representation of the derived seed 70 results from an earlier-performed cryptographic operation 74 (e.g., see the cryptographic operation 74(A) in FIG. 4) based on a higher-level seed.

In step 204, the electronic device performs a current cryptographic operation 74 (e.g., see the cryptographic operation 74(A)' in FIG. 5) based on a stored representation of the higher-level seed (e.g., see the seed record 70(HL) in FIG. 5). The current cryptographic operation 74(A)' results in a current representation of the derived seed 70 (e.g., see the seed record 70(A)' in FIG. 5).

In step 206, the electronic device provides a corruption detection signal 80(A) indicating whether the current representation of the derived seed 70 matches the stored representation of the derived seed 70 (e.g., see the signal 80(A) in FIG. 5). If the corruption detection signal 80(A) indicates a match, the stored representation of the higher-level seed 70 is reliable and can be used to generate a new seed record (e.g., see the seed record 70(B) in FIG. 5). However, if the corruption detection signal 80(A) does not indicate match, the electronic device is capable of carrying out a similar scrutiny at the next higher level (e.g., in an iterative manner) as described earlier in connection with FIGS. 4 through 6 for reliable detection and correction of seed record errors.

As described above, an improved technique involves determining whether a stored seed record 70(HL) is corrupted prior to deriving a new seed record 70(B) from the stored seed record 70(HL). If the stored seed record 70(HL) is not corrupted, the new seed record 70(B) can be derived safely from the stored seed record 70(HL). However, if the stored seed record 70(HL) is corrupted, the stored seed record 70(HL) can be recreated (e.g., from a higher-level seed record 70(NHL)) prior to deriving the new seed record 70(B). As a result, the technique provides both error detection and error correction capabilities to seed derivation. In the context of an authentication system 20, the technique provides authentication devices 22, 26 of the system 20 with self-repair capabilities 30 thus alleviating the need to manually detect defective devices and fix/replace equipment if there is a corrupted seed record.

While various embodiments of the invention have been particularly shown and described, it will be understood by those skilled in the art that various changes in form and details may be made therein without departing from the spirit and scope of the invention as defined by the appended claims.

For example, it should be understood that the authentication devices 22, 26 were described above as being a token and authentication server providing electronic access (e.g., login access) by way of example only. The authentication devices 22, 26 are well-suited for other applications as well such as door locks, merchandise purchases, starting vehicles, and so on.

Additionally, it should be understood that the authentication device 22 was described above as a handheld hardware token. In other arrangements, the authentication device 22 is implemented in software and runs on an electronic device

What is claimed is:

1. In an electronic apparatus, a method of carrying out key derivation, comprising:
   acquiring, by the electronic apparatus, a stored representation of a derived key, the stored representation of the derived key resulting from an earlier-performed cryptographic operation based on a higher-level key;
   performing a current cryptographic operation based on a stored representation of the higher-level key, the current cryptographic operation resulting in a current representation of the derived key;
   providing a corruption detection signal indicating whether the current representation of the derived key matches the stored representation of the derived key; and
   in response to the corruption detection signal indicating that the current representation of the derived key does not match the stored representation of the derived key, (i) deriving a current representation of the higher-level key and (ii) providing a signal indicating whether the current representation of the higher-level key matches the stored representation of the higher-level key.

2. A method as in claim 1, further comprising:
   in response to the corruption detection signal indicating that the current representation of the derived key matches the stored representation of the derived key, deriving a new key based on the stored representation of the higher-level key.

3. A method as in claim 2 wherein the electronic apparatus is arranged to supply a nonce parameter whose value changes over time;
   wherein the earlier-performed cryptographic operation inputted, as the nonce parameter, a particular value; and
   wherein performing the current cryptographic operation includes inputting the particular value to generate the current representation of the derived key.

4. A method as in claim 3 wherein deriving the new key includes:
   performing a new cryptographic operation which inputs, as the nonce parameter, a new value which is different than the particular value.

5. A method as in claim 4, further comprising:
   updating the nonce parameter to change its value at regular intervals over time, the delta between the particular value and the new value being a predetermined amount.

6. A method as in claim 1 wherein the stored representation of the higher-level key results from a prior-performed cryptographic operation based on a next-higher-level key; and wherein deriving the current representation of the higher-level key includes:
   performing a present cryptographic operation based on a stored representation of the next-higher-level key, the present cryptographic operation resulting in the current representation of the higher-level key.

7. A method as in claim 6, further comprising:
   in response to the signal indicating that the current representation of the higher-level key matches the stored representation of the higher-level key, deriving a new key based on the higher-level key.

8. A method as in claim 6, further comprising:
   in response to the signal indicating that the current representation of the higher-level key does not match the stored representation of the higher-level key, (i) deriving a current representation of the next-higher-level key and (ii) providing a signal indicating whether the current representation of the next-higher-level key matches the stored representation of the next-higher-level key.

9. In an electronic apparatus, a method of carrying out key derivation, comprising:
   acquiring, by the electronic apparatus, a stored representation of a derived key, the stored representation of the derived key resulting from an earlier-performed cryptographic operation based on a higher-level key;
   performing a current cryptographic operation based on a stored representation of the higher-level key, the current cryptographic operation resulting in a current representation of the derived key;
   providing a corruption detection signal indicating whether the current representation of the derived key matches the stored representation of the derived key;
   in response to the corruption detection signal indicating that the current representation of the derived key matches the stored representation of the derived key, deriving a new key based on the stored representation of the higher-level key; and
   in response to the corruption detection signal indicating that the current representation of the derived key does not match the stored representation of the derived key, determining whether the stored representation of the higher-level key is corrupted and, if so, replacing the stored representation of the higher-level key with a current representation of the higher-level key prior to deriving the new key based on the higher-level key.

10. A method as in claim 9 wherein the electronic apparatus is a portable token device having an output; and wherein the method further comprises:
    outputting, on the output of the portable token device, an authentication code based on the new key to enable a user to remotely authenticate to an authentication server.

11. A method as in claim 9 wherein the electronic apparatus is an authentication server; and wherein the method further comprises:
    using the new key to authenticate an authentication code outputted by a portable token device attempting to remotely authenticate to the authentication server.

12. A method as in claim 1, further comprising:
    selecting, as a current representation of a master key, a predominant value among master key values stored in separate master key storage locations of a memory of the electronic apparatus.

13. A method as in claim 12 wherein selecting the predominant value among the master key values includes:
    in response to the corruption detection signal indicating that the current representation of the derived key does not match the stored representation of the derived key, (i) reading the master key values from the memory of the electronic apparatus, and (ii) choosing, as the predominant value, the master key value which occurs most often among the master key values.

14. A method as in claim 13 wherein choosing the master key value includes:
    polling at least three master key values read from the memory of the electronic apparatus.

15. A method as in claim 14 wherein the memory of the electronic apparatus includes static random access memory (SRAM); and wherein reading the master key values from the memory includes:
    loading the master key values from the SRAM, the master key values having been stored in the SRAM prior to acquiring, performing and providing.

16. A hardware authenticator, comprising:
an electronic controller;
memory coupled to the electronic controller; and
a hand holdable casing having a set of peripheral walls which defines an internal space, the electronic controller and the memory being disposed within the internal space;
the electronic controller being arranged to:
acquire a stored representation of a derived key from the memory, the stored representation of the derived key resulting from an earlier-performed cryptographic operation based on a higher-level key;
perform a current cryptographic operation based on a stored representation of the higher-level key, the current cryptographic operation resulting in a current representation of the derived key; and
provide a corruption detection signal indicating whether the current representation of the derived key matches the stored representation of the derived key;
wherein, in response to the corruption detection signal indicating that the current representation of the derived key matches the stored representation of the derived key, the electronic controller is arranged to derive a new key based on the stored representation of the higher-level key; and
wherein, in response to the corruption detection signal indicating that the current representation of the derived key does not match the stored representation of the derived key, the electronic controller is arranged to determine whether the stored representation of the higher-level key is corrupted and, if so, replace the stored representation of the higher-level key with a current representation of the higher-level key prior to deriving the new key based on the higher-level key.

17. An authentication server to perform authentication, comprising:
a network interface;
memory; and
a processing circuit coupled to the network interface and the memory, the processing circuit being arranged to:
acquire a stored representation of a derived key from the memory, the stored representation of the derived key resulting from an earlier-performed cryptographic operation based on a higher-level key,
perform a current cryptographic operation based on a stored representation of the higher-level key, the current cryptographic operation resulting in a current representation of the derived key,
provide a corruption detection signal indicating whether the current representation of the derived key matches the stored representation of the derived key, and
using the derived key, respond to an authentication request received from a hardware authenticator through the network interface, the authentication request attempting to authenticate with the authentication server;
wherein, in response to the corruption detection signal indicating that the current representation of the derived key matches the stored representation of the derived key, the processing circuit is arranged to derive a new key based on the stored representation of the higher-level key; and
wherein, in response to the corruption detection signal indicating that the current representation of the derived key does not match the stored representation of the derived key, the processing circuit is arranged to determine whether the stored representation of the higher-level key is corrupted and, if so, replace the stored representation of the higher-level key with a current representation of the higher-level key prior to deriving the new key based on the higher-level key.

18. A method as in claim 1 wherein the electronic apparatus is a hardware authenticator, the hardware authenticator including an electronic controller, memory coupled to the electronic controller, and a hand holdable casing having a set of peripheral walls which defines an internal space, the electronic controller and the memory being disposed within the internal space; and
wherein the method further comprises:
after acquiring, performing, and providing are accomplished by the electronic controller in combination with the memory while the electronic controller and the memory reside within the internal space defined by the casing to enable, providing a password to authenticate the hardware authenticator with an authentication server, the password being based, at least in part, on the higher-level key.

* * * * *